May 12, 1942.　　A. G. F. WALLGREN　2,283,022
LUBRICANT SEAL FOR BEARINGS
Filed Feb. 7, 1939
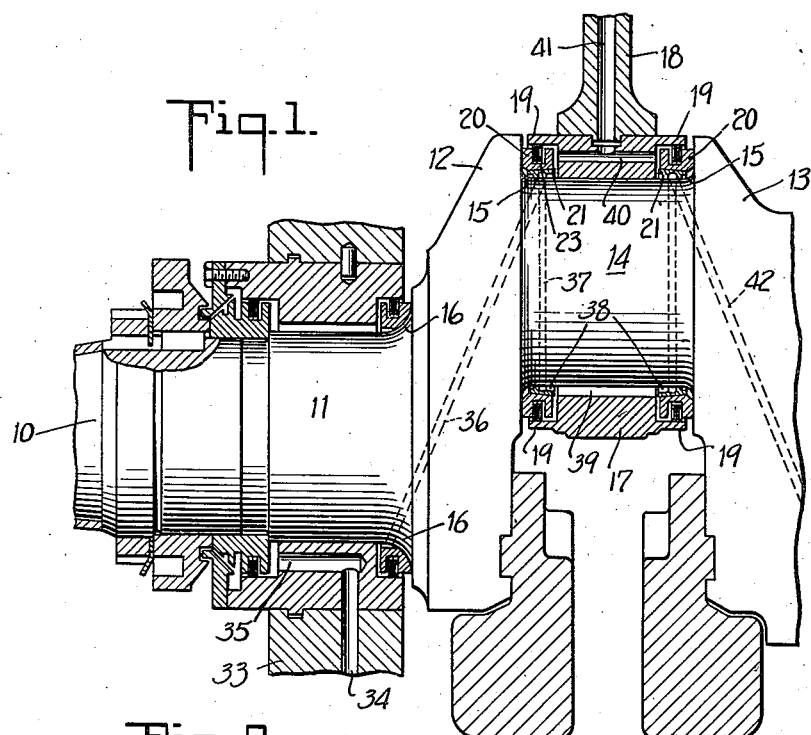
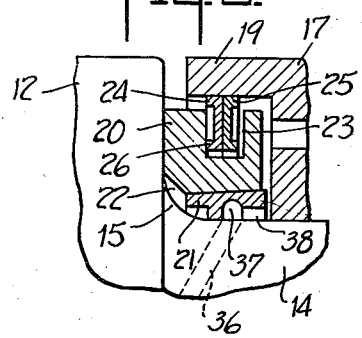
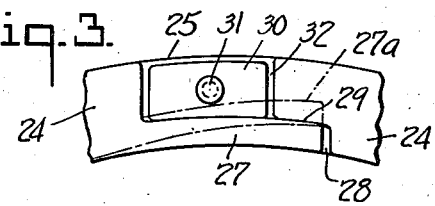
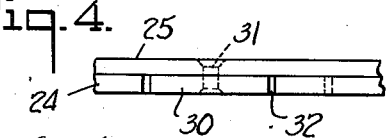
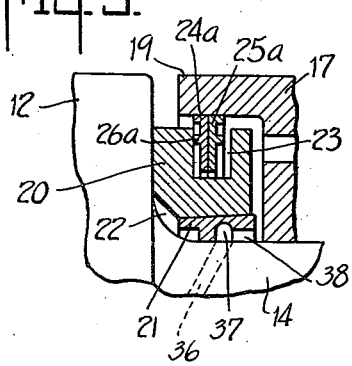
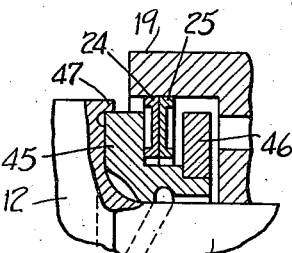
INVENTOR
August Gunnar Ferdinand Wallgren
BY
ATTORNEY Patented May 12, 1942

2,283,022

UNITED STATES PATENT OFFICE 2,283,022

LUBRICANT SEAL FOR BEARINGS

August Gunnar Ferdinand Wallgren, Eskilstuna, Sweden, assignor to Aktiebolaget Bolinder-Munktell, Eskilstuna, Sweden, a corporation of Sweden Application February 7, 1939, Serial No. 255,036
In Sweden February 11, 1938

14 Claims. (Cl. 308—36.3)

My invention relates to lubricant seals for bearings and particularly to seals for use in conjunction with a shaft bearing or the like in which the diameter of the shaft immediately adjacent the bearing is greater than the diameter of the bearing itself, as is the case with the main bearings and connecting rod bearings of a crankshaft.

Due to the fact that the bearings of a crankshaft are located immediately adjacent to the webs of the shaft, it has heretofore not been possible to provide a lubricant seal for such bearings. One reason for this is lack of space between the ends of the bearing and the webs in which to locate sealing means. In order to properly lubricate the bearings, lubricant should be supplied under pressure to the bearings and, through the lack of any sealing means, the lubricant expelled from between the bearing surfaces is violently thrown therefrom when the crankshaft rotates. A crank case is provided to collect this lubricant, from where it is drawn by the pump of the force feed lubricating system.

However, in two-cycle gasoline engines, air is compressed in the crank case to be used for scavenging the cylinders. If lubricant is sprayed into this air from the crankshaft bearings, a certain percentage of it is carried into the cylinders where it is burned upon the explosion of the fuel charge, thereby producing carbon. Moreover, such lubricant when introduced into the cylinders acts as additional fuel and, inasmuch as it is not regulated by the throttle, it causes variations in speed of the engine. Also a certain amount of impurities, such as dust, is introduced into the crank case by the air to be compressed, and these impurities contaminate lubricant within the crank case. Consequently, it has been found to be impractical to properly lubricate the crankshaft bearings of a two-cycle internal combustion engine, due to the fact that no means has been available for providing a lubricant seal for these bearings.

Accordingly, it is an object of this invention to provide a lubricant seal which may be used in connection with such bearings as those of a crankshaft and which permits the supply of adequate lubricant under pressure to the bearings, while preventing leakage of such lubricant.

Further objects and advantages of my invention will be apparent from the following description, considered in connection with the accompanying drawing which forms part of this specification and of which;

Fig. 1 is a cross-sectional view of an embodiment of my invention;

Fig. 2 is a cross-sectional view showing a portion of the device illustrated in Fig. 1, but on an enlarged scale;

Fig. 3 is a view on an enlarged scale of a detail of the device shown in Figs. 1 and 2;

Fig. 4 is a top view of the detail shown in Fig. 3;

Fig. 5 if a view similar to Fig. 2, but showing a second embodiment of my invention; and Fig. 6 is a similar view showing a third embodiment of my invention.

Referring more particularly to Fig. 1, reference character 10 designates a portion of a crankshaft having a main bearing 11 and webs 12 and 13 joined by a crank pin 14, all of these parts being integral as is usual in a crankshaft. At the places where the pin 14 is joined to the webs 12 and 13 fillets 15 are provided in order to avoid sharp corners. These fillets relieve the concentration of stress which would otherwise occur at these points. Likewise, a fillet 16 is provided at the point where the web 12 is joined to the portion of the shaft forming the main bearing 11.

Crank pin 14 forms one member of a connecting rod bearing, the other member of which is formed by the outer bearing element 17 which is rigidly secured to a connecting rod 18. Member 17 is formed with axially extending annular flanges 19 on either side thereof. Disposed within the annular space formed by the flanges 19 are ring members 20. In the embodiments shown in Figs. 1 through 5, members 20 are integral closed rings. While these rings have an inner diameter greater than the diameter of crank pin 14, this inner diameter is not sufficient to permit them to be passed over the webs 12 or 13. Consequently, the rings 20 either comprise two segments which have been welded together after having been placed around the crank pin, or they may be solid rings the material of which originally constituted part of the crankshaft and was cut away and separated from the shaft by machining operations.

Rings 20 have the cross-section shown more clearly in Fig. 2. From this figure it will be seen that the inner bore of ring 20 is slightly conical and a two-part wedging ring 21 is jammed within this conical bore and between the ring 20 and the crank pin 14 so as to hold the ring securely in place on the pin with one side of the ring in contact with the cheek of the web 12. The ring 20 is formed with a beveled or cut-away portion 22 for providing clearance for the fillets 15. Further, the ring 20 is formed with an outer annular groove 23.

Disposed within the groove 23 are preferably a plurality of resilient sealing rings 24 and 25. These rings are split in order to make it possible for them to be placed around the crank pin 14 and within the grooves 23. This may be done by separating the ends of the rings 24 and 25 sufficiently to permit the pin 14 and the ring 20 to pass between the separated ends of the resilient rings. The outer diameter of rings 24 and 25 is such that, with the rings in unstressed condition, this diameter is slightly greater than the inner diameter of the flanges 19. Consequently, the resiliency of these rings causes them to expand against this flange so as to form a substantially fluid tight seal therewith while still permitting axial displacement of the rings with respect to the flange. Ring 24 is formed with an annular projection 26, the outer face of which forms a sealing surface adapted to slide with respect to the sealing surface formed by one of the walls of the annular groove 23 in the ring 20. As shown, the ring 25 is also provided with an annular projection similar to projection 26 on ring 24, for the sake of uniformity in manufacture. Due to the resilient nature of the rings 24 and 25, the sealing surface formed on annular projection 26 is self-aligning with respect to the surface on the ring 20.

The split ends of the rings 24 are joined in the manner illustrated in Fig. 3. One end of the ring is formed with a tongue 27 which is adapted to be received within a recess 28 formed in the other end of the ring. Tongue 27, in unstressed condition, preferably takes the position indicated by the broken lines 27a in order that, when the tongue is forced into the recess 28, its resiliency urges it tightly against the surface 29 in order to prevent the leakage of lubricant.

The splits in the rings 24 and 25 are preferably staggered with respect to each other and in order to assure that these splits are staggered, one of the rings, for instance ring 25 may have secured thereto a plate 30 by means of a rivet 31. This plate 30 is adapted to be received within a recess 32 formed in the ring 24. This recess 32 is shown as being provided in the neighborhood of the split in the ring 24, while the plate 30 is secured to the ring 25 at a point remote from the split therein.

The plates 24 and 25 rotate with the bearing element 17 of the connecting rod and slide with respect to the ring 20 which is fixed to the crankshaft. These plates, being disposed at both ends of the connecting rod bearing, serve to provide closed spaces at either end of the bearing for retaining lubricant.

In Fig. 1 similar means are shown for providing a lubricant seal for the main bearing 11. The crank case 33 of the engine is formed with a passage 34 which leads from a lubricant pump or other source of lubricant under pressure. Passageway 34 supplies lubricant to a bore 35 which in turn supplies it to the main bearing 11 of the crankshaft. The crankshaft is formed with a bore 36 extending from the main bearing through the web 12 and communicating with an annular channel 37 formed in the locking rings 21. Axial passages 38 supply lubricant from the channel 37 to the connecting rod bearing 14 within the closed spaces formed by the plates 24 and 25. If desired, the bearing surface formed by the member 17 may be provided with axial grooves 39 for assuring that lubricant reaches the bearing surfaces. Also, an axial passage 40 may be formed in the member 17 to convey lubricant to a bore 41 formed in the connecting rod, and to the other end of the connecting rod bearing. Bore 41 serves to convey lubricant to the wrist pin bearing by means of which a piston is connected to the end of the connecting rod. A passage 42 extending through the web 13 may serve to convey lubricant to the connecting rod bearing from another main bearing adjacent to the web 13, or if the crankshaft is not provided with a main bearing between each of the connecting rod bearings, this passage may serve to convey lubricant to another connecting rod bearing.

When lubricant is supplied under pressure to the connecting rod bearing through the various passages, it exerts an axially thrust force on the rings 24 and 25 and serves to hold the sealing surface formed on the annular projection 26 in substantially fluid tight relationship with the ring 20. Thus, lubricant may be supplied under pressure to the connecting rod bearings without such lubricant escaping from these bearings and contaminating the scavenging air which is compressed within the crank case. Inasmuch as this lubricant is kept away from the air, the lubricant itself is not contaminated by any dirt which may be carried into the crank case by the air. It will be noted that, in spite of the small space available between the ends of the connecting rod bearing and the cheeks of the crank webs, applicant has provided a lubricant seal at these points which does not interfere with the fillets necessary at the points where the crank pin is joined to the webs.

Inasmuch as the force with which the surface formed on the annular projection 26 is urged into contact with the ring 20 depends upon the pressure of the lubricant supplied to the connecting rod bearing times the effective area of the ring on which this pressure acts, this force may be varied by changing the area. In Fig. 5 the annular projection, here designated by reference character 26a, is not formed at the innermost circumference of the ring 24a, but at a point located outwardly therefrom. Hence, the effective area of the ring on which the oil pressure acts is only that radially outside of the projection 26a. However, it is desirable to maintain the radial dimension of the ring 24a the same as that of the ring 24 so that the ring will have sufficient resiliency to properly engage the flange 19 of the member 17.

In order to reduce wear between rings 20 and 24, either the ring 20 or the annular projection 26 on ring 24 may be located eccentrically with respect to the axis of rotation of the connecting rod bearing 14. If this is done, the projection 26 will contact a wider band on ring 20, as the device rotates, whereby wear will be distributed and hence decreased.

In the embodiment shown in Fig. 6, the integral ring 20 of the previous embodiment is replaced by a split ring 45 which closely embraces the crank pin 14 and is held in place by means of an integral locking ring 46. Ring 46 may be formed of two parts which have been welded together around the crank pin, or this ring may have been machined from the crankshaft. If desired, the web of the crankshaft may be formed with an annular flange 47 which engages the outer circumference of the ring 45 and aids the locking ring 46 in securing the ring 45 to the crankshaft.

It will thus be seen that I am able to provide a lubricant seal for all the bearings of a crankshaft, including the connecting rod bearings. Hence, it is possible to supply lubricant to these bearings under pressure without having the lubricant escape from the bearings. This in turn is of particularly great advantage in connection with two-cycle engines in which the crankshaft serves for the compression of scavenging air.

Instead of supplying lubricant under pressure to the crankshaft bearings, it may be desirable to subject one end of one of the lubricant passages to a reduced pressure and thus draw lubricant through the bearing. In this event it would be necessary to provide spring means or the like for maintaining ring 24 in contact with ring 20, inasmuch as there is no fluid pressure available for this purpose. This absence of fluid also reduces the tendency for lubricant to leak through the seal.

While I have described several more or less specific embodiments of my invention, it is to be understood that this has been done for purposes of illustration only and that my invention is not to be limited thereby, but its scope is to be determined by the appended claims.

What is claimed is:

1. A bearing sealing device for use with a machine embodying a crankshaft having a crank web and a crank pin connected thereto, and a connecting rod journaled on said pin, said rod and said pin having cooperating bearing surfaces; said sealing device including a ring fixedly secured to said crankshaft in contact with said web and having a sealing surface, and an element carried by said connecting rod and having a self-aligning surface slidably engaging said sealing surface to provide a closed chamber for retaining lubricant.

2. A bearing sealing device for use with a machine embodying a crankshaft member having a crank pin disposed between crank webs, and a connecting rod member journaled on said pin, said rod and said pin having cooperating bearing surfaces; said sealing device including one piece rigid rings secured to said crank shaft in fixed relation to said webs and having sealing surfaces, the internal diameter of said rings being greater than the diameter of said pin but insufficient to permit passage of said rings over said crank webs, and elements carried by said connecting rod and having self-aligning surfaces slidably engaging said sealing surfaces to provide a closed chamber for retaining lubricant.

3. A bearing sealing device for use with a machine embodying a crankshaft having a crank web and a crank pin connected thereto, and a connecting rod journaled on said pin, said rod and said pin having cooperating bearing surfaces; said sealing device including an integral ring having an internal diameter exceeding the diameter of said pin, a segmental locking ring jammed in the annular space between said pin and said integral ring to secure the latter to said crankshaft, said integral ring having a sealing surface, and an element carried by said connecting rod and having a self-aligning surface slidably engaging said sealing surface to form a closed space for retaining lubricant.

4. A bearing sealing device for use with a machine embodying a crankshaft having a crank web and a crank pin connected thereto, and a connecting rod journaled on said pin, said rod and said pin having cooperating bearing surfaces; said sealing device including a ring secured to said crankshaft in contact with said web and having a sealing surface disposed in a substantially radial plane, and an element carried by said connecting rod and displaceable with respect thereto in a direction axially of said bearing surfaces, said element having a self-aligning surface slidably contacting said sealing surface to provide a closed chamber for retaining lubricant.

5. A bearing sealing device for use with a machine embodying a crankshaft having a crank web and a crank pin connected thereto, and a connecting rod journaled on said pin, said rod and said pin having cooperating bearing surfaces; said sealing device including a ring secured to said crankshaft and formed with an annular groove in its outer surface, said groove providing a sealing surface disposed in a substantially radial plane, and an element carried by said connecting rod and displaceable with respect thereto in a direction axially of said bearing surfaces and extending into said groove, said element having a self-aligning surface slidably contacting said sealing surface to provide a closed chamber for retaining lubricant.

6. A bearing sealing device for use with a machine embodying a crankshaft having a crank web and a crank pin connected thereto, and a connecting rod journaled on said pin, said rod and said pin having cooperating bearing surfaces; said sealing device including a ring secured to said crankshaft and formed with an annular groove in its outer surface, said groove providing a sealing surface disposed in a substantially radial plane, and an element carried by said connecting rod and displaceable with respect thereto in a direction axially of said bearing surfaces and extending into said groove, said element having a raised narrow annular surface slidably contacting said sealing surface to form a closed chamber for retaining lubricant.

7. A bearing sealing device for use with a machine embodying a crankshaft having a crank web and a crank pin connected thereto, and a connecting rod journaled on said pin, said rod and said pin having cooperating bearing surfaces; said sealing device including a ring fixedly secured to said crankshaft adjacent to the end of said pin and having a sealing surface disposed in a substantially radial plane, and laminated structure comprising a plurality of rings carried by said connecting rod, one of said rings having a self-aligning surface slidably contacting said sealing surface to provide a closed chamber for retaining lubricant.

8. A bearing sealing device for use with a machine embodying a crankshaft having a crank web and a crank pin connected thereto, and a connecting rod journaled on said pin, said rod and said pin having cooperating bearing surfaces; said sealing device including a ring secured to said crankshaft adjacent to the end of said pin and having a sealing surface disposed in a substantially radial plane, and a split resilient sealing ring disposed within a circular recess formed in said connecting rod, the diameter of said ring when unstressed being greater than the diameter of said recess, said ring having a self-aligning surface slidably contacting said sealing surface to provide a closed chamber for retaining lubricant.

9. A bearing sealing device for use with a machine embodying a crankshaft having a crank web and a crank pin connected thereto, and a connecting rod journaled on said pin, said rod and said pin having cooperating bearing surfaces; said sealing device including a ring secured to said crankshaft adjacent to the end of said pin and having a sealing surface disposed in a substantially radial plane, and an element carried by said connecting rod and having a self-aligning surface slidably engaging said sealing surface to provide a closed chamber for retaining lubricant, said surfaces being arranged eccentrically with respect to each other.

10. A bearing sealing device for use with a machine embodying a crankshaft having a crank web and a crank pin connected thereto, and a connecting rod journaled on said pin, said rod and said pin having cooperating bearing surfaces; said sealing device including a ring fixedly secured to said crankshaft adjacent to the end of said pin and having a sealing surface disposed in a substantially radial plane, and laminated structure comprising a plurality of split rings carried by said connecting rod, the open ends of the respective rings being staggered and one of said rings having a self-aligning surface slidably contacting said sealing surface to form a closed chamber for retaining lubricant.

11. A bearing sealing device for use with a machine embodying a crankshaft having a crank web and a crank pin connected thereto, and a connecting rod journaled on said pin, said rod and said pin having cooperating bearing surfaces; said sealing device including a ring fixedly secured to said crankshaft adjacent to the end of said pin and having a sealing surface disposed in a substantially radial plane, and a split ring carried by said connecting rod, the ends of said ring being overlapped, said ring having a self-aligning surface slidably contacting said sealing surface to provide a closed chamber for retaining lubricant.

12. A bearing sealing device for use with a machine embodying a crankshaft having a crank web and a crank pin connected thereto, and a connecting rod journaled on said pin, said rod and said pin having cooperating bearing surfaces; said sealing device including a ring fixedly secured to said crankshaft in contact with said web and having a sealing surface, an element carried by said connecting rod and having a sealing surface, and means for urging said element towards said ring to maintain said surfaces in contact.

13. A bearing sealing device for use with a machine embodying a crankshaft having a crank web and a crank pin connected thereto, a connecting rod journaled on said pin, said rod and said pin having cooperating bearing surfaces, and means for supplying lubricant under pressure to said bearing surfaces; said sealing device including a ring fixedly secured to said crankshaft adjacent to said web and having a sealing surface, and an element carried by said connecting rod and having a sealing surface, said element being subjected to the pressure of said lubricant whereby the sealing surface thereof is urged into sliding contact with the surface on said ring.

14. In a bearing sealing device for crankshaft bearings having inner and outer bearing elements, the crankshaft comprising structure including webs, the diameter of the bearing being less than the thickness of said webs on both sides thereof, said sealing device including a member contacting the outer of said elements under outwardly acting initial tension, said member being rigid in radial direction and sliding with axially self-adjustable sealing surfaces against the crankshaft structure, said member being deformable so that on assembly it is threaded on the inner element by elastic deformation.

AUGUST GUNNAR FERDINAND WALLGREN.